US012630460B2

(12) United States Patent (10) Patent No.: US 12,630,460 B2
Rich et al. (45) Date of Patent: \*May 19, 2026

(54) HIGH ALUMINA LOW SODA GLASS COMPOSITIONS

(71) Applicant: Vitro Flat Glass LLC, Cheswick, PA (US)

(72) Inventors: John Rich, Allison Park, PA (US); Alan Miller, Gibsonia, PA (US); José Guadalupe Cid-Aguilar, Monterrey (MX)

(73) Assignee: Vitro Flat Glass LLC, Cheswick, PA (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/683,792

(22) Filed: Mar. 1, 2022

(65) Prior Publication Data

US 2022/0298056 A1 Sep. 22, 2022

Related U.S. Application Data

(62) Division of application No. 16/452,835, filed on Jun. 26, 2019, now Pat. No. 11,292,742.

(60) Provisional application No. 62/690,663, filed on Jun. 27, 2018.

(51) Int. Cl.
*C03C 3/087* (2006.01)
*C03C 3/078* (2006.01)
*C03C 4/08* (2006.01)

(52) U.S. Cl.
CPC .............. *C03C 3/087* (2013.01); *C03C 3/078* (2013.01); *C03C 4/085* (2013.01); *C03C 2203/10* (2013.01)

(58) Field of Classification Search
CPC ......... C03C 3/087; C03C 3/078; C03C 4/085; C03C 2203/10; C03C 4/02; C03C 4/08; C03C 4/20
See application file for complete search history.

(56) References Cited

U.S. PATENT DOCUMENTS

| | | | |
|---|---|---|---|
| 4,203,745 A | 5/1980 | Battigelli et al. | |
| 4,381,934 A | 5/1983 | Kunkle et al. | |
| 4,792,536 A | 12/1988 | Pecoraro et al. | |
| 4,886,539 A | 12/1989 | Gerutti et al. | |
| 5,055,428 A | 10/1991 | Porter | |
| 5,071,796 A | 12/1991 | Jones et al. | |
| 5,925,583 A | 7/1999 | Yoshii et al. | |
| 5,958,811 A * | 9/1999 | Sakaguchi .............. C03C 4/082 |
| | | | 501/71 |
| 6,080,695 A | 6/2000 | Scheffler-Hudlet et al. | |
| 6,114,264 A | 9/2000 | Krumwiede et al. | |
| 6,313,053 B1 | 11/2001 | Shelestak | |
| 6,350,712 B1 | 2/2002 | Cabrera-Ilanos | |
| 6,455,452 B1 | 9/2002 | Krumwiede | |
| 6,656,862 B1 | 12/2003 | Krumwiede et al. | |
| 6,849,566 B2 | 2/2005 | Shelestak et al. | |
| 6,953,758 B2 | 10/2005 | Arbab et al. | |
| 6,962,887 B2 | 11/2005 | Heithoff | |
| 7,071,133 B2 | 7/2006 | Arbab et al. | |
| 7,625,830 B2 | 12/2009 | Shelestak et al. | |
| 7,659,221 B2 | 2/2010 | Arbab et al. | |
| 7,666,806 B2 | 2/2010 | Shelestak et al. | |
| 7,678,722 B2 | 3/2010 | Shelestak | |
| 7,691,763 B2 | 4/2010 | Arbab et al. | |
| 7,825,051 B2 | 11/2010 | Smith et al. | |
| 7,902,097 B2 | 3/2011 | Cid-Aguilar et al. | |
| 8,268,741 B2 | 9/2012 | Heithoff et al. | |
| 8,440,583 B2 | 5/2013 | Shelestak et al. | |
| 8,445,066 B2 | 5/2013 | Jahns | |
| 8,664,132 B2 | 3/2014 | Shelestak | |
| 8,901,021 B2 | 12/2014 | Shelestak et al. | |
| 9,115,021 B2 | 8/2015 | Cid-Aguilar et al. | |
| 10,377,660 B2 | 8/2019 | Lambricht et al. | |
| 10,773,991 B2 | 9/2020 | Hijiya et al. | |
| 2002/0160901 A1 * | 10/2002 | Landa ..................... C03C 3/095 |
| | | | 501/905 |
| 2003/0054938 A1 | 3/2003 | Pecoraro et al. | |
| 2005/0170944 A1 | 8/2005 | Arbab et al. | |
| 2006/0211563 A1 | 9/2006 | Arbab et al. | |
| 2007/0155610 A1 | 7/2007 | Maquin et al. | |
| 2007/0214833 A1 * | 9/2007 | Arbab ..................... C03C 3/095 |
| | | | 501/64 |
| 2011/0291436 A1 * | 12/2011 | Shelestak ................ C03C 4/085 |
| | | | 501/13 |
| 2012/0289394 A1 * | 11/2012 | Nagai ..................... C03C 3/087 |
| | | | 501/72 |

(Continued)

FOREIGN PATENT DOCUMENTS

| EP | 0834481 A1 | 4/1998 |
|---|---|---|
| EP | 1116699 A1 | 7/2001 |

(Continued)

OTHER PUBLICATIONS

WO2017073566A1 machine translation (Year: 2017).*

(Continued)

*Primary Examiner* — Cameron K Miller

(74) *Attorney, Agent, or Firm* — The Webb Law Firm

(57) ABSTRACT

A glass composition includes a base glass portion comprising: 65-75 wt % $SiO_2$; 5-15 wt % CaO; 0-5 wt % MgO; 0-5 wt % $K_2O$; 10-14 wt % $Na_2O$; and 1-5 wt % $Al_2O_3$; wherein the glass composition has a ratio of $Na_2O$ to $Al_2O_3$ is in the range of 9.5-12.5 wt %/wt %.

14 Claims, No Drawings

(56)            References Cited

U.S. PATENT DOCUMENTS

| | | | |
|---|---|---|---|
| 2014/0144498 | A1 | 5/2014 | Shelestak et al. |
| 2014/0309099 | A1 | 10/2014 | Naylor et al. |
| 2015/0166403 | A1 | 6/2015 | Yamamoto |
| 2016/0159680 | A1 | 6/2016 | Naylor et al. |
| 2016/0194238 | A1 | 7/2016 | Naylor et al. |

FOREIGN PATENT DOCUMENTS

| | | | | |
|---|---|---|---|---|
| EP | 1281687 | A1 | 2/2003 | |
| GB | 1303822 | A | 1/1973 | |
| JP | H1230449 | A | 9/1989 | |
| JP | 2000143284 | A | 5/2000 | |
| JP | 2002338298 | A | 11/2002 | |
| WO | 2011093284 | A1 | 8/2011 | |
| WO | 2016091672 | A1 | 6/2016 | |
| WO | 2016198249 | A1 | 12/2016 | |
| WO | 2017022508 | A1 | 2/2017 | |
| WO | WO-2017073566 | A1 * | 5/2017 | ............ C03C 3/078 |
| WO | 2017171403 | A1 | 10/2017 | |
| WO | 2017222187 | A1 | 12/2017 | |
| WO | 2018015382 | A1 | 1/2018 | |

OTHER PUBLICATIONS

Lyle A. K. et al. "The Effect of Alumina Upon the Chemical Durability of Sand-Soda-Lime Glasses" Journal of the American Ceramic Society, vol. 19, No. 1012, Jan. 1, 1936 (Jan. 1, 1936), pp. 142-147, XP055894658, US, ISSN: 0002-7820, DOI: 10.1111/j. 1151-2916.1936.tb19812.x.

\* cited by examiner

HIGH ALUMINA LOW SODA GLASS COMPOSITIONS

CROSS REFERENCE TO RELATED APPLICATIONS

This application claims priority to U.S. patent application Ser. No. 16/452,835, filed on Jun. 26, 2019, which claims the benefit of U.S. Provisional Application No. 62/690,663, filed Jun. 27, 2018, the enclosures of which are incorporated herein by reference in their entireties.

BACKGROUND OF THE INVENTION

Field of the Invention

This invention relates to a low-solar-absorbing blue glass, and more particularly to a high alumina, low soda glass composition and glass substrate.

Technical Considerations

Insulating glass (IG) units are preferred windows in residential and commercial buildings because they reduce energy transmittance through the window. As is appreciated by those skilled in the art, reducing energy transmittance through the IG unit reduces heat losses from the building interior during the winter, and reduces heat gain to the building interior during the summer. For example, some particular glass compositions which provide superior optical properties are described in U.S. Pat. Nos. 8,268,741, 6,313, 053, and 4,792,536, which are hereby incorporated by reference herein in their entireties.

However, some presently available IG units may be prone to chemical damage when stored for an extended period of time. For example, such glass substrates may become "stained" or corroded due to exposure to water and/or the atmosphere, which may reduce the quality and value of the glass, particularly in architectural applications or other applications where visual appearance may be of importance.

Accordingly, as can now be appreciated by those skilled in the art, it would be desirable to provide improved glass compositions which may increase the chemical durability of an insulating glass while maintaining or improving upon the targeted color, solar absorption, melt characteristics, and other optical and/or physical properties thereof.

SUMMARY OF THE INVENTION

In order to address some or all of the above-referenced deficiencies in the art, the present disclosure provides a high alumina, low soda glass composition, which, when used in a low-solar-absorbing blue glass substrate (e.g. a glass sheet cut from a glass ribbon made using a continuous flat glass making process), provides the low-solar-absorbing blue glass substrate with increased chemical durability while allowing low-solar-absorbing blue glass substrate to substantially maintain its target melt characteristics and optical properties.

Accordingly, provided herewith is a glass composition comprising a base glass portion comprising: 65-75 wt % $SiO_2$; 5-15 wt % CaO; 0-5 wt % MgO; 0-5 wt % $K_2O$; 10-14 wt % $Na_2O$; and 1-5 wt % $Al_2O_3$; wherein the glass composition has a ratio of $Na_2O$ to $Al_2O_3$ is in the range of 9.5-12.5 wt %/wt %. The base glass portion may have a ratio of CaO to MgO in the range of 1.5-2.2 wt %/wt %. The base glass portion may further comprise 0.1-0.5 wt % $K_2O$. The base glass portion may comprise 68-74 wt % $SiO_2$, 13-13.5 wt % $Na_2O$, 1-1.4 wt % $Al_2O_3$; 8.1-8.6 wt % CaO, and 4.5-5 wt % MgO.

The total iron in the glass composition may be in the range of 0.01 to 0.60 wt %. The glass composition may have a redox ratio of less than or equal to 0.6. The glass composition may further comprise a colorant portion comprising CoO in an amount ranging from 30 to 120 ppm and/or Se in an amount no greater than 7.5 ppm. The glass composition may, when formed as a glass sheet, have a color described by the following chromaticity coordinates: an a* ranging from −4 to +4 and a b* ranging from 0 to −20. The glass composition may, when formed as a glass sheet, have a visible light transmittance of no greater than 80%.

The total iron in the glass composition may be in the range of 0.2 to 0.8 wt %. The glass composition may have a redox ratio in the range of 0.4-0.6. The glass composition may further comprise a colorant portion comprising CoO in an amount no greater than 20 ppm and/or Se in an amount no greater than 3 ppm. The glass composition, when formed as a glass sheet, may have a color described by the following chromaticity coordinates: an a* ranging from −8 to −16 and a b* ranging from +3 to −17. The glass composition may, when formed as a glass sheet, have a visible light transmittance of no greater than 80%.

The colorant portion may comprise at least one of the following: oxides of manganese, tin, cerium, molybdenum, vanadium, copper, zinc, tungsten, and lanthanum, or any combination thereof.

These and other features and characteristics of the present invention, as well as the methods of operation and functions of the related elements of structures and the combination of parts and economies of manufacture, will become more apparent upon consideration of the following description and the appended claims with reference to the included examples, all of which form a part of this specification. It is to be expressly understood, however, that the examples are for the purpose of illustration and description only and are not intended as a definition of the limits of the invention. As used in the specification and the claims, the singular form of "a," "an," and "the" include plural referents unless the context clearly dictates otherwise.

DESCRIPTION OF THE PREFERRED EMBODIMENTS

All numbers used in the specification and claims are to be understood as being modified in all instances by the term "about". By "about" is meant a range of plus or minus ten percent of the stated value.

All ranges disclosed herein encompass the beginning and ending range values and any and all subranges subsumed therein. The ranges disclosed herein represent the average values over the specified range.

All documents referred to herein are "incorporated by reference" in their entirety.

By "at least" is meant "greater than or equal to". By "not greater than" or "at most" is meant "less than or equal to".

Any reference to amounts, unless otherwise specified, is "by wt %" (wt %).

The term "includes" is synonymous with "comprises".

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

As used herein, the term visible light transmittance ("Tvis") represents a computed value based on measured transmittance data using CIE standard illuminate "D65" and CIE 1931 standard (2°) observer over the wavelength range of 380 to 770 nanometers at 10 nanometer intervals.

As used herein, color is described in terms of chromaticity coordinates a* and b* which represent computed values based on measured transmittance data using CIE standard illuminate "D65" and CIE 1964 supplementary standard (10°) observer. Transmitted data are collected with a Perkin-Elmer Lambda 9 spectrophotometer with a 150 mm Lab-sphere integrating sphere lined with Spectralon, following the methodology of ASTM E903-96, "Standard Test Method for Solar Absorptance, Reflectance, and Transmittance of Materials using Integrating Spheres."

Calculation of Tvis (also known as tristimulus value "Y") and chromaticity coordinates follows the methodology found in ASTM E308-90, "Standard Test Method for Computing the Colors of Objects Using the CIE System."

Color values (e.g., $L^*$, $a^*$, $b^*$, $C^*$, and hue$\underline{°}$) are in accordance with the 1976 CIELAB color system specified by the International Commission on Illumination. The $L^*$, $a^*$, and $b^*$ values in the specification and claims represent color center point values. As is standard practice in the industry, all Tvis and chromaticity coordinates are determined using a flat glass sheet having a reference thickness of 5.66 mm (0.223 in).

Iron can be present in the glass composition as both ferric oxide ($Fe_2O_3$) and ferrous oxide (FeO). As is well known in the art, $Fe_2O_3$ is a strong absorber of ultraviolet radiation and is a yellow colorant, and FeO is a strong absorber of infrared radiation and is a blue colorant. The amount of iron present in the ferrous state ($Fe^{++}$) in the glass composition of the present invention is expressed in terms of the wt % of "FeO" present in the glass composition, as is standard practice in the industry. As is appreciated by those skilled in the art, although the amount of iron in the ferrous state ($Fe^{++}$) is expressed as FeO, the entire amount in the ferrous state ($Fe^{++}$) may not actually be present in the glass as FeO.

The amount of "total iron" present in the glass composition of the invention is expressed in terms of the wt % of "$Fe_2O_3$" present in the glass composition, as is standard practice in the industry. This does not imply that all of the iron present in the glass composition is in the form of $Fe_2O_3$. As used herein, the term "redox ratio" indicates the amount of iron in the ferrous state (expressed as "FeO") divided by the amount of total iron (expressed as "$Fe_2O_3$").

The invention comprises, consists of, or consists essentially of the following aspects of the invention, in any combination. Various aspects of the invention are illustrated in separate examples. However, it is to be understood that this is simply for ease of illustration and discussion. In the practice of the invention, one or more aspects of the invention discussed in one example can be combined with one or more aspects of the invention discussed in one or more of the other examples.

The invention relates to a glass composition including a base glass portion. In non-limiting embodiments the base glass portion is of the type referred to in the art as a "soda-lime-silica" glass composition. In some non-limiting embodiments, the glass composition may further include a colorant portion, which includes colorants selected amounts to provide a glass substrate or sheet formed from the glass composition with targeted optical properties, as described in further detail herein. For example, the colorant portion may comprise colorants including, but not limited to, iron oxides (both ferric oxide ($Fe_2O_3$) and ferrous oxide (FeO)), cobalt oxide (CoO), selenium (Se), chromium oxide ($Cr_2O_3$), neodymium oxide ($Nd_2O_3$), titanium oxide ($TiO_2$), erbium oxide ($Er_2O_3$), and nickel oxide (NiO). Unless indicated otherwise, the wt % of a component of the base glass portion, and of the glass colorant portion of the glass composition is based on the total weight of the glass composition, i.e., the total weight of the base glass portion plus the total weight of the colorant portion.

In accordance with the present disclosure, it has been found that the chemical durability of a glass may be improved, and the targeted optical characteristics (e.g., the color and light transmittances as described herein) may be maintained or improved upon by providing a base glass composition as described herein. For example, in some non-limiting embodiments, the base glass portion may include 68-74 wt % $SiO_2$, more preferably, 70-73 wt % $SiO_2$, more preferably, 71.75-72.25 wt % $SiO_2$, and most preferably 71.762 to 71.905 wt % $SiO_2$. The base glass portion may further include 8.1-8.6 wt % CaO, more preferably 8.2-8.5 wt % CaO, more preferably, 8.3-8.4 wt % CaO, and most preferably, 8.335-8.355 wt % CaO. The base glass portion may further include 13-13.5 wt % $Na_2O$, preferably 13.1-13.4 wt % $Na_2O$, more preferably 13.15-13.3 wt % $Na_2O$, and most preferably 13.19-13.25 wt % $Na_2O$. The base glass portion may further include 1-1.4 wt % $Al_2O_3$, more preferably 1.1-1.3 wt % $Al_2O_3$, more preferably 1.15-1.25 wt % $Al_2O_3$, and most preferably, 1.21 to 1.23 wt % $Al_2O_3$. The base glass portion may further include 4.5-5 wt % MgO, preferably 4.6-4.9 wt % MgO, more preferably 4.7-4.8 wt % MgO, and most preferably 4.71-4.73 wt % MgO. The base glass portion may further include 0.1-0.5 wt % $K_2O$, preferably 0.2-0.4 wt % $K_2O$, more preferably 0.30-0.35 wt % $K_2O$, and most preferably, 0.32-0.34 wt % $K_2O$. In addition, the base glass portion may contain non-effective tramp materials such as SrO, $ZrO_2$, Cl and BaO, generally in concentrations of less than 1 wt %.

Alternatively, in some non-limiting embodiments, the base glass portion may most preferably include 71.99-72.11 wt % $SiO_2$, 8.10-8.26 wt % CaO, 13.22-13.32 wt % $Na_2O$, 1.18-1.26 wt % $Al_2O_3$, 4.71-4.73 wt % MgO, and/or 0.316-0.336 wt % $K_2O$.

Alternatively, in some non-limiting embodiments, the base glass portion may most preferably include 71.69-71.75 wt % $SiO_2$, 8.06-8.14 wt % CaO, 13.18-13.23 wt % $Na_2O$, 1.22-1.25 wt % $Al_2O_3$, 4.63-4.68 wt % MgO, and/or 0.323-0.331 wt % $K_2O$.

In addition, in accordance with the present disclosure, it has been found that the chemical durability of a glass may be improved, and the targeted optical characteristics (e.g., the color and light transmittances as described herein) may be maintained or improved upon by providing a base glass composition including a ratio of $Na_2O$ to $Al_2O_3$ in the range of 9.5-12.5 wt %/wt %, preferably, in the range of 10.0-11.5 wt %/wt %, more preferably, in the range of 10.5-11.0 wt %/wt %, and most preferably, in the range of 10.55-10.90 wt %/wt %.

Alternatively, in some non-limiting embodiments, the base glass portion may most preferably include a ratio of $Na_2O$ to $Al_2O_3$ in the range of 10.540-11.220 wt %/wt %.

Alternatively, in some non-limiting embodiments, the base glass portion may most preferably include a ratio of $Na_2O$ to $Al_2O_3$ in the range of 10.552-10.884 wt %/wt %.

Further, in accordance with the present disclosure, it has been found that the chemical durability of a glass may be improved, and the targeted optical characteristics (e.g., the color and light transmittances as described herein) maintained or improved upon by providing a base glass composition including a ratio of CaO to MgO in the range of 1.5-2.2 wt %/wt %, more preferably, in the range of 1.6-2.1 wt %/wt %, more preferably, in the range of 1.65-1.85 wt %/wt %, and most preferably, in the range of 1.7-1.8 wt %/wt %.

Alternatively, in some non-limiting embodiments, the base glass portion may most preferably include a ratio of CaO to MgO in the range of 1.76-1.80 wt %/wt %.

Alternatively, in some non-limiting embodiments, the base glass portion may most preferably include a ratio of CaO to MgO in the range of 1.72-1.75 wt %/wt %.

Additionally, in accordance with the present disclosure, it has been found that providing a ratio of $Na_2O$ to $Al_2O_3$ in the ranges discussed above allows for the amount of $K_2O$ to be increased as compared to existing compositions while still maintaining or improving upon the targeted optical characteristics (e.g., the color and light transmittances as described herein), such that the base glass composition may include $K_2O$ in the ranges discussed above.

In some non-limiting embodiments, it may be desired that the glass composition, when formed as a glass sheet or substrate, meets certain color and light transmission requirements in accordance with a desired application.

For example, in some non-limiting embodiments, it may be desired to produce a glass sheet that has a color having the following chromaticity coordinates: an a* ranging from −4 to +4 and a b* ranging from 0 to −20; preferably an a* ranging from −3 to +1 and a b* ranging from −2 to −12; more preferably ranging from an a*−2.5 to 0, and a b* ranging from −4 to −9, and most preferably ranging from an a*−1.8 to −0.5 and a b*−5 to −8. Glasses with these color coordinates are considered blue-violet in color. It may further be desirable that the glass sheet or substrate may also have a visible light transmittance ("Tvis") of no greater than 80%, preferably ranging from 40% to 80%, more preferably from 50% to 76%, more preferably from 55% to 72%, and most preferably 58 to 70%.

In accordance with the present disclosure, it has been found that this can be achieved by providing a glass composition including a base glass portion as described herein and where the total iron in the glass composition is in the range of 0.01 to 0.60 wt %, preferably in the range of 0.08 to 0.26 wt %, more preferably in the range of 0.15 to 0.25 wt %, and most preferably in the range of 0.16 to 0.17 wt %. The glass composition may have a redox ratio of less than or equal to 0.6, preferably in the range of 0.10-0.35, more preferably in the range of 0.2 to 0.35, most preferably in the range of 0.20-0.31.

Alternatively, in some non-limiting embodiments, the base glass portion may most preferably have a total iron content in the range of 0.155-0.210 wt % and a redox ratio in the range of 0.221-0.311.

In addition, the glass composition may be provided with a colorant portion including cobalt oxide (CoO), which is a blue colorant. For example, the colorant may include CoO in an amount ranging from 30 to 120 parts per million ("ppm"), preferably in the range of 32 to 90 ppm, more preferably in the range of 45 to 60 ppm, and most preferably in the range of 37 to 50 ppm.

Alternatively, in some non-limiting embodiments, the colorant portion may most preferably include CoO in an amount ranging from 49-57 ppm.

Additionally, the colorant portion may include Selenium (Se) in an amount no greater than 7.5 ppm, preferably from 1 to 6 ppm, more preferably from 2 to 5.5 ppm and most preferably from 3 to 5 ppm. It is noted that selenium can exist in glass in four oxidation states: $Se^{+4}$ and $Se^{+2}$, which add no color to the glass, $Se^0$, which in the glass is a pink colorant, and $Se^{-2}$, which in the presence of iron is a bronze colorant. As is the standard practice in the industry, total selenium is expressed as weight fraction of Se even though it may not be in the elemental state in the glass.

Alternatively, in some non-limiting embodiments, the colorant portion may most preferably include Se in an amount ranging from 2 to 7 ppm.

In other non-limiting embodiments, it may be desired to produce a glass substrate or sheet that has the following chromaticity coordinates: an a* ranging from −8 to −16 and a b* ranging from +3 to −17; preferably an a* ranging from −11 to −13 and a b* ranging from −6 to −8; more preferably an a* ranging from −11.5 to −12.5, and a b* ranging from −6.5 to −7.5, and most preferably an a* ranging from −11.75 to −12.25 and a b* ranging from −6.75 to −7.25. It may further be desirable that the glass substrate or sheet have a Tvis of no greater than 80%, preferably ranging from 40% to 80%, more preferably from 60% to 75%, and most preferably from 66% to 70%.

In accordance with the present disclosure, it has been found that this can be achieved by providing a glass composition including a base glass portion as described herein and where the total iron in the glass composition is in the range of 0.2 to 0.8 wt %, preferably in the range of 0.3 to 0.7 wt %, more preferably in the range of 0.42 to 0.62 wt %, most preferably in the range of 0.46 to 0.58 wt %. In some non-limiting embodiments, the glass composition may have a redox ratio in the range of 0.4-0.6, preferably in the range of 0.47-0.60, more preferably in the range of 0.52 to 0.58, and most preferably in the range of 0.54 to 0.56.

Alternatively, in some non-limiting embodiments, the base glass portion may most preferably have a total iron content in the range of 0.49-0.58 wt % a redox ratio in the range of 0.47 to 0.54.

In addition, the glass composition may be provided with a colorant portion including CoO in an amount no greater than 20 ppm, preferably in the range of 2 to 15 ppm, more preferably in the range of 4 to 12 ppm, and most preferably in the range of 6 to 10 ppm.

Alternatively, in some non-limiting embodiments, the colorant portion may most preferably include CoO in an amount ranging from 7.1-12.1 ppm.

Additionally, the colorant portion may include Se in an amount no greater than 3 ppm, preferably in the range of 0.25 to 2 ppm, and most preferably in the range of 0.5 to 1.75 ppm.

Alternatively, in some non-limiting embodiments, the colorant portion may most preferably include Se in an amount no greater than 3 ppm.

It will be appreciated by those skilled in the art that a glass composition in accordance with the present invention is not limited to the above-described combinations of colorants and the amounts thereof. For example, it has been found that as the ratio of CoO to Se increases and the amount of the other colorants in the glass composition remain constant, the color of the glass is more blue, and as the ratio of CoO to Se decreases and the amount of the other colorants in the glass composition remain constant, the color of the glass is less blue and more yellow. Accordingly, in some non-limiting embodiments, the glass composition of the present invention may have a wt % ratio of CoO to Se equal to or greater than 5, more preferably, in a range of 7 to 18, and most preferably in a range of 10 to 13. Alternatively, in further non-limiting embodiments, the wt % ratio of CoO to Se may be preferably at least 6, more preferably at least 7, and most preferably at least 8.

In addition, in non-limiting embodiments, certain types of colorants may be substituted for other colorants while still achieving acceptable results. For example, it has been found that the glass colorant portion can include a mixture of chromium oxide and cobalt oxide to reduce the wt % of iron oxide while still achieving acceptable for results. For example, and not limiting to the invention, a mixture of 6 ppm $Cr_2O_3$ and 0.4 ppm CoO can be added to compensate for a reduction of 100 ppm of $Fe_2O_3$, while still achieving acceptable optical characteristics.

Similarly, in some non-limiting embodiments, neodymium oxide, a blue colorant, can be included in the composition to reduce the wt % of cobalt oxide. For example, and not limiting to the invention, 180 ppm neodymium oxide expressed as $Nd_2O_3$ can be added to compensate for every 1 ppm reduction of CoO, while still achieving acceptable optical characteristics. For example, in non-limiting embodiments, a glass composition including 180 ppm neodymium oxide may have a colorant portion including CoO in an amount no greater than 19 ppm, preferably in the range of 1 to 14 ppm, more preferably in the range of 3 to 11 ppm, and most preferably in the range of 5 to 9 ppm.

Similarly, in another non-limiting embodiment of the invention, a mixture of 4000 ppm erbium oxide as $Er_2O_3$, a pink colorant, and 1200 ppm $Fe_2O_3$ can replace a mixture of 1 ppm Se and 6 ppm CoO. Furthermore, a mixture of 1600 ppm titanium oxide as $TiO_2$, a yellow colorant, and 4 ppm CoO can replace a mixture of 1 ppm Se and 600 ppm $Fe_2O_3$.

Other colorants that can be used in the practice of the invention include but are not limited to oxides of manganese, tin, cerium, molybdenum, vanadium, copper, zinc, tungsten and lanthanum. For example, in one non-limiting embodiment, 1000 ppm of $MnO_2$, a yellow colorant in glass, can replace a mixture of 1 ppm Se and 200 ppm $Fe_2O_3$, while still achieving acceptable optical characteristics.

Although not limiting to the invention, in the preferred practice of the invention nickel oxide is excluded from the glass composition because of the tendency to form nickel sulfide stone defects, which can cause spontaneous breakage in tempered glass. However, in those instances when environmental concerns restrict the use of selenium, nickel oxide, titanium oxide, and also erbium oxide, an expensive glass colorant, can be used to reduce the wt % of selenium. For example, and not limiting to the invention, a mixture of 35 ppm nickel oxide as NiO, a yellow colorant in glass, and 1 ppm of CoO can replace a mixture of 1 ppm of Se and 700 ppm $Fe_2O_3$.

In a non-limiting embodiment of the invention, the described glass composition is formed into a glass substrate using any conventional glass making process known in the art, and preferably using a continuous flat glass making process. For example, but not limiting to the invention, the glass composition can be formed from batch materials via crucible melts, a sheet drawing process, a float glass process, etc. For example, in some non-limiting embodiments, the described glass composition may be formed by a process including the following steps: feeding raw materials as batch materials to a container (e.g., a crucible), melting the batch materials in the container to form a molten glass composition, passing, from the container, the molten glass composition into a pool of a molten metal (e.g., tin) such that the molten glass composition floats in the pool of molten metal, forming the molten glass composition into the shape of a flat glass product on the pool of molten metal, and cooling the molten glass composition to form a flat glass product. In the preferred practice of the invention, the glass is melted and refined in a continuous, large-scale, commercial glass melting operation and formed into flat glass sheets of varying thickness, e.g., but not limiting to the invention up to 25 millimeters ("mm") by the float process in which the molten glass is supported on a pool of molten metal, usually tin, as it assumes a ribbon shape and is cooled, in a manner well known in the art.

In some non-limiting embodiments, the glass compositions described herein may be obtained by using one or more of the following raw materials as batch materials: Nepheline Syenite, limestone, dolomite, soda ash, rouge, graphite, salt cake, alumina, and cullet (i.e., recycled glass).

Although it is preferred that the glass described herein be made using a conventional, overhead fired continuous melting operation, as is well known in the art, the glass can also be produced using a multi-stage melting operation, as described in U.S. Pat. No. 4,381,934 to Kunkle, et al., U.S. Pat. No. 4,792,536 to Pecoraro, et al. and U.S. Pat. No. 4,886,539 to Cerutti, et al. If required, a stirring arrangement can be employed within the melting and/or forming stages of the glass production operation to homogenize the glass in order to improve the optical quality of the glass.

Depending on the type of melting operation, sulfur can be added to the batch materials of a soda-lime-silica glass as a melting and refining aid. Commercially produced float glass can include up to about 0.3 wt % $SO_3$. In a glass composition that includes iron and sulfur, providing reducing conditions can create amber coloration which lowers luminous transmittance as discussed in U.S. Pat. No. 4,792,536 to Pecoraro, et al. However, it is believed that the reducing conditions required to produce this coloration in float glass compositions of the type described herein are limited to approximately the first 20 microns of the lower glass surface contacting the molten tin during the float forming operation, and to a lesser extent, to the exposed upper glass surface. Because of the glass low sulfur content and the limited region of the glass in which any coloration could occur, depending on the particular soda-lime-silica glass composition, sulfur in these surfaces essentially has no material effect on the glass color or spectral properties.

It should be appreciated that as a result of forming the glass on molten tin as discussed above, measurable amounts of tin oxide may migrate into surface portions of the glass on the side contacting the molten tin. Typically, a piece of float glass has an $SnO_2$ concentration ranging from about 0.05 to 2 wt % in about the first 25 microns below the surface of the glass that was in contact with the tin. Typical background levels of $SnO_2$ can be as high as 30 ppm. It is believed that high tin concentrations in about the first 10 angstroms of the glass surface supported by the molten tin can slightly increase the reflectivity of that glass surface; however, the overall impact on the glass properties is minimal.

As is appreciated by those skilled in the art of glass making, a result of the raw materials and/or equipment used to produce glass, including producing glass of the present invention, results in certain impurities, for example, SrO and $ZrO_2$, being present in the final glass composition. Such materials are present in the glass composition in minor amounts and are referred to herein as "tramp materials". By way of illustration and not limiting to the invention, it is believed that glass compositions of the instant invention produced by a commercial float process as discussed earlier can include low concentrations, e.g., tramp levels of colorants, e.g., $Cr_2O_3$, $MnO_2$ and $TiO_2$. These levels are referred to as "tramp levels" because they do not materially affect the color characteristics and spectral properties of glass sheets or substrates formed from the glass compositions of the invention. For example, and not limiting to the invention, $Cr_2O_3$ in amounts no greater than 10 ppm is considered a tramp material; $MnO_2$ in amounts no greater than 50 ppm is considered a tramp material, and $TiO_2$ in amounts no greater than 0.02 wt % is considered a tramp material.

In view of the foregoing and as illustrated by the following examples, it can now be appreciated by those skilled in the art, glass substrates having 1-1.4 wt % $Al_2O_3$, preferably, 1.1-1.3 wt % $Al_2O_3$, more preferably, 1.15-1.25 wt % $Al_2O_3$, and most preferably, 1.21 to 1.23 wt % $Al_2O_3$; and 13-13.5 wt % $Na_2O$, preferably, 13.1-13.4 wt % $Na_2O$, more preferably, 13.15-13.3 wt % $Na_2O$, and most preferably, 13.19-13.25 wt % $Na_2O$ show markedly improved durability. Further, it may now be appreciated that glass substrates where the ratio of $Na_2O$ to $Al_2O_3$ is in the range of 9.5-12.5 wt %/wt %, preferably, in the range of 10.0-11.5 wt %/wt %, more preferably, in the range of 10.5-11.0 wt %/wt %, and most preferably, in the range of 10.55-10.90 wt %/wt %, show markedly improved durability over as compared to other glass compositions, such as those having a higher $Na_2O$ concentration and a lower $Al_2O_3$ concentration.

In addition, in view of the foregoing and as illustrated by the following examples, it may now be appreciated that glass substrates having 8.1-8.6 wt % CaO, preferably 8.2-8.5 wt % CaO, more preferably, 8.3-8.4 wt % CaO, and most preferably, 8.335-8.355 wt % CaO; and 4.5-5 wt % MgO, preferably 4.6-4.9 wt % MgO, more preferably 4.7-4.8 wt % MgO, and most preferably, 4.71-4.73 wt % MgO, show markedly improved durability. Further, it may now be appreciated that glass substrates where the ratio of CaO to MgO is in the range of 1.5-12.2 wt %/wt %, preferably, in the range of 1.6-2.1 wt %/wt %, more preferably, in the range of 1.65-1.85 wt %/wt %, and most preferably, in the range of 1.70-1.80 wt %/wt %, show markedly improved chemical durability over other glass compositions, such as those having a higher CaO concentration and a lower MgO concentration.

In addition, in view of the foregoing and as illustrated by the following examples, it may now be appreciated that glass substrates having 0.1-0.5 wt % $K_2O$, preferably, 0.2-0.4 wt % $K_2O$, more preferably, 0.30-0.35 wt % $K_2O$, and most preferably, 0.32-0.34 wt % $K_2O$ show markedly improved chemical durability over other glass compositions, such as those having a lower $K_2O$ concentration.

In certain embodiments, the glass substrates or glass compositions can contain the constituents identified in Table 1, below.

TABLE 1

| Comp | A wt.% | B wt.% | C wt.% | D wt.% | E wt.% |
|---|---|---|---|---|---|
| $SiO_2$ | 71.7-72.0 | 71.2-71.6 | 71.4-72.0 | 71.9-72.2 | 71.6-71.8 |
| $Na_2O$ | 13.1-13.3 | 13.4-13.5 | 13.1-13.4 | 13.2-13.4 | 13.1-13.3 |
| $K_2O$ | 0.24-0.33 | 0.24-0.25 | 0.29-0.31 | 0.32-0.34 | 0.32-0.33 |
| CaO | 8.3-8.4 | 8.3-8.6 | 8.2-8.6 | 8.0-8.3 | 8.0-8.2 |
| MgO | 4.7-4.8 | 5.0-5.2 | 4.6-5.0 | 4.5-4.7 | 4.6-4.7 |
| $Al_2O_3$ | 1.2-1.3 | 1.1-1.2 | 1.1-1.3 | 1.1-1.3 | 1.2-1.3 |
| $Fe_2O_3$ | 0.16-0.17 | 0.20-0.21 | 0.16-0.17 | 0.16-0.18 | 0.49-0.58 |
| Comp Ratios | wt. %/ wt. % | wt. %/ wt. % | wt. %/ wt. % | wt. %/ wt. % | wt. %/ wt. % |
| $Na_2O$: $Al_2O_3$ | 10.7-11.0 | 11.1-11.3 | 10.5-11.4, more preferably 10.5-11.3, | 10.4-11.2 | 10.5-10.9 |

TABLE 1-continued

| Comp | A wt.% | B wt.% | C wt.% | D wt.% | E wt.% |
|---|---|---|---|---|---|
| CaO: MgO | 1.7-2.9 | 1.7-1.9, most preferably 1.7-1.8 | most preferably 10.6-11.2 1.6-1.9, more preferably 1.7-1.8, most preferably 1.72-1.76 | 1.7-1.9 | 1.7-1.8 |

Optionally, Composition D from Table 1 may include a colorant. The colorant may include CoO; SeO; $Cr_2O_3$; and/or $MnO_2$ in the amounts described above. Optionally, Composition E from Table 1 may include a colorant. The colorant may CoO; $Cr_2O_3$; and/or $MnO_2$ in the amounts described above.

EXAMPLES

Non-limiting embodiments of the present invention are illustrated by the following non-limiting examples. Comparative Examples C1-C5, shown in Table 1, and Examples 1-10, shown in Tables 2 and 3, were made using a continuous flat glass making process, as described herein, and the final composition of each sample was determined by X-Ray Fluorescence Spectroscopy.

The chemical durability shown for each example represents a measurement of the hydrolytic resistance of the glass and was calculated by the procedures described in the International Organization for Standardization test ISO 719, which is available at: <https://www.iso.org/standard/4948.html>, and which is hereby incorporated by reference in its entirety herein. In accordance with ISO 719, 2 g of each glass sample, particle size 300-500 µm, was kept for 60 min in 50 mL deionized water of grade 2 at 98 degrees C. 25 mL of the obtained solution was then titrated against 0.01 mol/L HCl solution to the point of neutralization. The volume of the HCl needed for neutralization was then used to determine the amount of $Na_2O$ that was extracted from the glass. The values shown in the Durability rows of Tables 1, 2, and 3, represent the amount of $Na_2O$ that was extracted in µm, with lower values representing an improved chemical durability.

Table 1, below shows data for comparative examples, C1-C5.

| Example | C1 | C2 | C3 | C4 | C5 |
|---|---|---|---|---|---|
| $SiO_2$ | 72.92 | 71.375 | 71.49 | 71.395 | 71.365 |
| $Na_2O$ | 13.72 | 13.125 | 13.115 | 13.46 | 13.455 |
| $K_2O$ | 0.085 | 0.0625 | 0.062 | 0.2445 | 0.243 |
| CaO | 8.84 | 9.215 | 9.145 | 8.43 | 8.66 |
| MgO | 3.83 | 4.18 | 4.14 | 5.09 | 4.9 |
| $Al_2O_3$ | 0.16 | 0.98 | 0.98 | 0.96 | 0.96 |
| $SO_3$ | 0.156 | 0.1595 | 0.1655 | 0.177 | 0.176 |
| $Fe_2O_3$ | 0.168 | 0.8726 | 0.87045 | 0.20105 | 0.2003 |
| Cl | 0 | 0.012 | 0.0115 | 0.014 | 0.013 |
| $Cr_2O_3$ | 0.0002 | 0.000335 | 0.00033 | 0.000295 | 0.00031 |
| $MnO_2$ | 0.0054 | 0.0076 | 0.00905 | 0.00635 | 0.00625 |
| $TiO_2$ | 0.012 | 0.01 | 0.01 | 0.01 | 0.01 |
| ZnO | 0.041 | 0.001 | 0.001 | 0.001 | 0.001 |
| $Na_2O/Al_2O_3$ | 85.75 | 13.39286 | 13.38265 | 14.02083 | 14.01563 |
| CaO/MgO | 2.308094 | 2.204545 | 2.208937 | 1.656189 | 1.767347 |
| Durability | 253 | 202 | 202 | 200 | 204 |

Table 2, below, shows data for examples 1-5

TABLE 2

| Example | 1 | 2 | 3 | 4 | 5 |
|---|---|---|---|---|---|
| $SiO_2$ | 71.845 | 71.77 | 71.905 | 71.715 | 71.635 |
| $Na_2O$ | 13.22 | 13.24 | 13.225 | 13.245 | 13.18 |
| $K_2O$ | 0.294 | 0.2965 | 0.2965 | 0.296 | 0.305 |
| CaO | 8.32 | 8.345 | 8.285 | 8.395 | 8.48 |
| MgO | 4.755 | 4.79 | 4.725 | 4.81 | 4.8 |
| $Al_2O_3$ | 1.21 | 1.21 | 1.22 | 1.195 | 1.245 |
| $SO_3$ | 0.1615 | 0.156 | 0.1595 | 0.1485 | 0.1625 |
| $Fe_2O_3$ | 0.1639 | 0.16375 | 0.163 | 0.1631 | 0.16195 |
| Cl | 0.013 | 0.0115 | 0.012 | 0.013 | 0.0125 |
| $Cr_2O_3$ | 0.00018 | 0.00026 | 0.00018 | 0.00017 | 0.0002 |
| $MnO_2$ | 0.00625 | 0.0063 | 0.0062 | 0.0062 | 0.0062 |
| $TiO_2$ | 0.0105 | 0.01 | 0.01 | 0.01 | 0.01 |
| ZnO | 0.001 | 0.001 | 0.001 | 0.001 | 0.001 |
| $Na_2O/Al_2O_3$ | 10.92562 | 10.94215 | 10.84016 | 11.08368 | 10.586345 |
| CaO/MgO | 1.749737 | 1.742171 | 1.753439 | 1.745322 | 1.7666667 |
| Durability | 183 | 183 | 183 | 182 | 182 |

Table 3, below is a continuation of Table 2, and shows data for examples 6-10

TABLE 3

| Example | 6 | 7 | 8 | 9 | 10 |
|---|---|---|---|---|---|
| $SiO_2$ | 71.98 | 71.42 | 71.675 | 71.875 | 71.615 |
| $Na_2O$ | 13.245 | 13.32 | 13.275 | 13.11 | 13.25 |
| $K_2O$ | 0.291 | 0.296 | 0.2965 | 0.2985 | 0.297 |
| CaO | 8.255 | 8.505 | 8.43 | 8.38 | 8.485 |
| MgO | 4.695 | 4.92 | 4.765 | 4.745 | 4.785 |
| $Al_2O_3$ | 1.175 | 1.195 | 1.21 | 1.23 | 1.22 |
| $SO_3$ | 0.156 | 0.1445 | 0.1485 | 0.152 | 0.1625 |
| $Fe_2O_3$ | 0.1654 | 0.16675 | 0.16485 | 0.1665 | 0.16415 |
| Cl | 0.014 | 0.0135 | 0.013 | 0.014 | 0.0135 |
| $Cr_2O_3$ | 0.000245 | 0.000245 | 0.00022 | 0.00019 | 0.000305 |
| $MnO_2$ | 0.00615 | 0.0061 | 0.00625 | 0.00615 | 0.00615 |
| $TiO_2$ | 0.01 | 0.01 | 0.01 | 0.0105 | 0.0095 |
| ZnO | 0.001 | 0.001 | 0.001 | 0.001 | 0.001 |
| $Na_2O/Al_2O_3$ | 11.2723404 | 11.14644 | 10.97107 | 10.658537 | 10.860656 |
| CaO/MgO | 1.75825346 | 1.728659 | 1.76915 | 1.7660695 | 1.7732497 |
| Durability | 184 | 184 | 184 | 178 | 185 |

The invention is described further in the following numbered clauses:

Clause 1. A glass composition comprising a base glass portion comprising: 65-75 wt % $SiO_2$; 5-15 wt % CaO; 0-5 wt % MgO; 0-5 wt % $K_2O$; 10-14 wt % $Na_2O$; and 1-5 wt % $Al_2O_3$; wherein the glass composition has a ratio of $Na_2O$ to $Al_2O_3$ is in the range of 9.5-12.5 wt %/wt %, preferably in the range of 10.0-11.5 wt %/wt %, more preferably in the range of 10.5-11.0 wt %/wt %, and most preferably in the range of 10.55-10.90 wt %/wt %.

Clause 2. The glass composition of clause 1, wherein: the base glass portion has a ratio of CaO to MgO in the range of 1.5-2.2 wt %/wt %, preferably, in the range of 1.6-2.1 wt %/wt %, more preferably, in the range of 1.65-1.85 wt %/wt %, and most preferably, in the range of 1.7-1.8 wt %/wt %.

Clause 3. The glass composition of any one of clauses 1-2, wherein: the base glass portion comprises 0.1-0.5 wt % $K_2O$, preferably 0.2-0.4 wt % $K_2O$, more preferably 0.30-0.35 wt % $K_2O$, and most preferably 0.32-0.34 wt % $K_2O$.

Clause 4. The glass composition of any one of the preceding clauses, wherein the base glass portion comprises: 68-74 wt % $SiO_2$, more preferably, 70-73 wt % $SiO_2$, more preferably, 71.75-72.25 wt % $SiO_2$, and most preferably 71.7 to 72 wt % $SiO_2$, 13-13.5 wt % $Na_2O$, preferably 13.1-13.4 wt % $Na_2O$, more preferably 13.15-13.3 wt % $Na_2O$, and most preferably, 13.1-13.7 wt % $Na_2O$; 1-1.4 wt % $Al_2O_3$, more preferably 1.1-1.3 wt % $Al_2O_3$, more preferably 1.15-1.25 wt % $Al_2O_3$, and most preferably 1.21 to 1.23 wt % $Al_2O_3$; 8.0-8.6 wt % CaO, preferably 8.2-8.5 wt % CaO, more preferably, 8.3-8.4 wt % CaO, and most preferably, 8.335 to 8.355 wt % CaO; and/or 4.5-5 wt % MgO, preferably 4.6-4.9 wt % MgO, more preferably 4.7-4.8 wt % MgO, and most preferably, 4.71 to 4.73 wt % MgO.

Clause 5. The glass composition of any one of the preceding clauses, wherein the total iron in the glass composition is in the range of 0.01 to 0.30 wt %, preferably in the range of 0.04 to 0.28 wt %, more preferably in the range of 0.08 to 0.26 wt %, more preferably in the range of 0.15 to 0.25 wt %, and most preferably in the range of 0.163 to 0.165 wt %.

Clause 6. The glass composition of any one of the preceding clauses, wherein the glass composition has a redox ratio of less than or equal to 0.6, preferably in the range of 0.10-0.35, and most preferably in the range of 0.2 to 0.31.

Clause 7. The glass composition of any one of the preceding clauses, further comprising a colorant portion, the colorant portion comprising: CoO in an amount ranging from 30 to 120 ppm, preferably in the range of 32 to 90 ppm, more preferably in the range of 45 to 60 ppm, and most preferably in the range of 37 to 50 ppm; and/or Se in an amount no greater than 7.5 ppm, preferably in the range of 1 to 6 ppm, more preferably in the range of 2 to 5.5 ppm, and most preferably in the range of 3 to 5 ppm.

Clause 8. The glass composition of any one of the preceding clauses, wherein the glass composition, when formed as a glass sheet, has a color described by the following chromaticity coordinates: an a* ranging from −4 to +4 and a b* ranging from 0 to −20; preferably an a* ranging from −3 to +1 and a b* ranging from −2 to −12; more preferably ranging from an a*−2.5 to 0, and a b* ranging from −4 to −9, and most preferably ranging from an a*−1.8 to −0.5 and a b*−5 to −8.

Clause 9. The glass composition of any one of the preceding clauses, wherein the glass composition, when formed as a glass sheet, has a visible light transmittance ranging from no greater than 80%, preferably 40% to 80%, more preferably from 50% to 76%, more preferably from 55% to 72%, and most preferably 58 to 70%.

Clause 10. The glass composition of any one of clauses 1-4, wherein the total iron in the glass composition is in the range of 0.2 to 0.8 wt %, preferably in the range of 0.3 to 0.7 wt %, preferably in the range of 0.42 to 0.62 wt %, preferably in the range of 0.46 to 0.58 wt %.

Clause 11. The glass composition of any one of clauses 1-4 and 10, wherein the glass composition has a redox ratio in the range of 0.4-0.6, preferably in the range of 0.47-0.60, more preferably in the range of 0.52 to 0.58, and most preferably in the range of 0.54 to 0.56.

Clause 12. The glass composition of any one of clauses 1-4 and 10-11, further comprising a colorant portion comprising: CoO in an amount no greater than 20 ppm, preferably in the range of 2 to 15 ppm, more preferably in the range of 4 to 12 ppm, and most preferably in the range of 6 to 10 ppm; and/or Se in an amount no greater than 3 ppm, preferably in the range of 0.25 to 2 ppm, and most preferably in the range of 0.5 to 1.75 ppm.

Clause 13. The glass composition of any one of clauses 1-4 and 10-12, wherein the glass composition, when formed as a glass sheet has a color described by the following chromaticity coordinates: an a* ranging from −8 to −16 and a b* ranging from +3 to −17; preferably an a* ranging from −11 to −13 and a b* ranging from −6 to −8; more preferably an a* ranging from −11.5 to −12.5, and a b* ranging from −6.5 to −7.5, and most preferably an a* ranging from −11.75 to −12.25 and a b* ranging from −6.75 to −7.25.

Clause 14. The glass composition of any one of clauses 1-4 and 10-13, wherein the glass composition, when formed as a glass sheet, has a visible light transmittance ranging from no greater than 80%, preferably 40% to 80%, more preferably from 60% to 75%, and most preferably from 66% to 70%.

Clause 15. The glass composition of any one of the preceding clauses, wherein the colorant portion comprises at least one of the following: oxides of manganese, tin, cerium, molybdenum, vanadium, copper, zinc, tungsten, and lanthanum, or any combination thereof.

Clause 16. A method of producing a glass sheet having: a color described by the following chromaticity coordinates: an a* ranging from −4 to +4 and a b* ranging from 0 to −20; preferably an a* ranging from −3 to +1 and a b* ranging from −2 to −12; more preferably an a* ranging from −2.5 to 0, and a b* ranging from −4 to −9, and most preferably an a* ranging from −1.8 to −0.5 and a b* ranging from −5 to −8; and a visible light transmittance of no greater than 80%, preferably ranging from 40% to 80%, more preferably from 50% to 76%, more preferably from 55% to 72%, and most preferably 58 to 70%, the method comprising: producing, by a float glass process, the glass composition according to any one of clauses 1-7 and 15.

Clause 17. A method of producing a glass sheet having: a color described by the following chromaticity coordinates: an a* ranging from −8 to −16 and a b* ranging from +3 to −17; preferably an a* ranging from −11 to −13 and a b* ranging from −6 to −8; more preferably an a* ranging from −11.5 to −12.5, and a b* ranging from −6.5 to −7.5, and most preferably an a* ranging from −11.75 to −12.25 and a b* ranging from −6.75 to −7.25; and a visible light transmittance of no greater than 80%, preferably ranging from 40% to 80%, more preferably from 60% to 75%, and most preferably from 66% to 70%, the method comprising: preparing, by a float glass process, a glass composition according to any one of clauses 1-4, 11-12, and 15.

Clause 18. A method of producing a glass sheet having: a color described by the following chromaticity coordinates: an a* ranging from −4 to +4 and a b* ranging from 0 to −20; preferably an a* ranging from −3 to +1 and a b* ranging from −2 to −12; more preferably an a* ranging from −2.5 to 0, and a b* ranging from −4 to −9, and most preferably an a* ranging from −1.8 to −0.5 and a b* ranging from −5 to −8; and a visible light transmittance of no greater than 80%, preferably ranging from 40% to 80%, more preferably from 50% to 76%, more preferably from 55% to 72%, and most preferably 58 to 70%, the method comprising: feeding raw materials as batch materials to a container melting the batch materials in the container to form a glass composition according to any one of clauses 1-7 and 15, passing, from the container, the molten glass composition into a pool of a molten metal, preferably tin, such that the molten glass composition floats in the pool of molten metal, forming the molten glass composition into the shape of the flat glass sheet on the pool of molten metal, and cooling the molten glass composition to form the flat glass sheet.

Clause 19. A method of producing a glass sheet having: a color described by the following chromaticity coordinates: an a* ranging from −8 to −16 and a b* ranging from +3 to −17; preferably an a* ranging from −11 to −13 and a b* ranging from −6 to −8; more preferably an a* ranging from −11.5 to −12.5, and a b* ranging from −6.5 to −7.5, and most preferably an a* ranging from −11.75 to −12.25 and a b* ranging from −6.75 to −7.25; and a visible light transmittance of no greater than 80%, preferably ranging from 40% to 80%, more preferably from 60% to 75%, and most preferably from 66% to 70%, the method comprising: feeding raw materials as batch materials to a container, melting the batch materials in the container to form a glass composition according to any one of clauses 1-4, 11-12, and 15, passing, from the container, the molten glass composition into a pool of a molten metal, preferably tin, such that the molten glass composition floats in the pool of molten metal, forming the molten glass composition into the shape of the flat glass sheet on the pool of molten metal, and cooling the molten glass composition to form the flat glass sheet.

Clause 20. The method of any one of clauses 19 and 20, wherein the batch materials comprise at least one of the following: Nepheline Syenite, limestone, dolomite, soda ash, rouge, graphite, salt cake, alumina, and cullet, or any combination thereof.

Clause 21. Use of a glass composition according to any one of clauses 1-7 and 15 in a float glass process to form a glass sheet having: a color described by the following chromaticity coordinates: an a* ranging from −4 to +4 and a b* ranging from 0 to −20; preferably an a* ranging from −3 to +1 and a b* ranging from −2 to −12; more preferably an a* ranging from −2.5 to 0, and a b* ranging from −4 to −9, and most preferably an a* ranging from −1.8 to −0.5 and a b* ranging from −5 to −8; and a visible light transmittance of no greater than 80%, preferably ranging from 40% to 80%, more preferably from 50% to 76%, more preferably from 55% to 72%, and most preferably 58 to 70%.

Clause 22. Use of a glass composition according to any one of clauses 1-4, 11-12, and 15 in a float glass process to form a glass sheet having: an a* ranging from −8 to −16 and a b* ranging from +3 to −17; preferably an a* ranging from −11 to −13 and a b* ranging from −6 to −8; more preferably an a* ranging from −11.5 to −12.5, and a b* ranging from −6.5 to −7.5, and most preferably an a* ranging from −11.75 to −12.25 and a b* ranging from −6.75 to −7.25; and a visible light transmittance of no greater than 80%, preferably ranging from 40% to 80%, more preferably from 60% to 75%, and most preferably from 66% to 70%.

Clause 23. A glass composition comprising a base glass portion comprising:

$SiO_2$ 71.7-72.0 wt. %;

CaO 8.3-8.4 wt. %;

MgO 4.7-4.8 wt. %;

$K_2O$ 0.24-0.33 wt. %;

$Na_2O$ 13.1-13.3 wt. %; and $Al_2O_3$ 1.2-1.3 wt. %.

Clause 24. The glass composition of clause 23 further comprising 0.16-0.17 wt. % $Fe_2O_3$.

Clause 25. The glass composition of clause 23 or clause 24 wherein the ratio of $Na_2O$ to $Al_2O_3$ is 10.7-11.0 wt. %/wt. %

Clause 26. The glass composition of any one of clause 23-25 wherein the ratio of CaO to MgO is 1.7-2.9 wt. %/wt. %.

Clause 27. The glass composition of any one of clause 23-26 wherein the the ratio of CaO to MgO is 1.7-1.9 wt. %/wt. %.

Clause 28. The glass composition of any one of clause 23-26 wherein the the ratio of CaO to MgO is 1.6-1.9 wt. %/wt. %.

Clause 29. The glass composition of any one of clause 23-26 wherein the the ratio of CaO to MgO is 1.7-1.8 wt. %/wt. %.

Clause 30. A glass composition comprising a base glass portion comprising:

$SiO_2$ 71.2-71.6 wt. %;

CaO 8.3-8.6 wt. %;

MgO 5.0-5.2 wt. %;

$K_2O$ 0.24-0.25 wt. %;

$Na_2O$ 13.4-13.5 wt. %; and $Al_2O_3$ 1.1-1.2 wt. %.

Clause 31. The glass composition of clause 30 further comprising 0.20-0.21 wt. % $Fe_2O_3$.

Clause 32. The glass composition of clause 30 or clause 31 wherein the ratio of $Na_2O$ to $Al_2O_3$ is 11.1-11.3 wt. %/wt. %

Clause 33. The glass composition of any one of clause 30-32 wherein the ratio of CaO to MgO is 1.7-1.9 wt. %/wt. %.

Clause 34. The glass composition of any one of clause 30-33 wherein the ratio of CaO to MgO is 1.7-1.8 wt. %/wt. %.

Clause 35. The glass composition of any one of clause 30-33 wherein there is 8.3-8.4 wt. % of the CaO.

Clause 36. A glass composition comprising a base glass portion comprising:

$SiO_2$ 71.4-72.0 wt. %;

CaO 8.2-8.6 wt. %;

MgO 4.6-5.0 wt. %;

$K_2O$ 0.29-0.31 wt. %;

$Na_2O$ 13.1-13.4 wt. %; and $Al_2O_3$ 1.1-1.3 wt. %.

Clause 37. The glass composition of clause 36 further comprising 0.16-0.17 wt. % $Fe_2O_3$.

Clause 38. The glass composition of clause 36 or clause 37 wherein the ratio of $Na_2O$ to $Al_2O_3$ is 10.5-11.4 wt. %/wt. %.

Clause 39. The glass composition of any one of clause 36-38 wherein the ratio of CaO to MgO is 1.6-1.9 wt. %/wt. %.

Clause 40. The glass composition of any one of clause 36-39 wherein the ratio of $Na_2O$ to $Al_2O_3$ is 10.5-11.3 wt. %/wt. %.

Clause 41. The glass composition of any one of clause 36-40 wherein the ratio of $Na_2O$ to $Al_2O_3$ is 10.6-11.2 wt. %/wt. %.

Clause 42. The glass composition of any one of clause 36-41 wherein the ratio of CaO to MgO is 1.7-1.8 wt. %/wt. %.

Clause 43. A glass composition comprising a base glass portion comprising:

$SiO_2$ 71.9-72.2 wt. %;

CaO 8.0-8.3 wt. %;

MgO 4.5-4.7 wt. %;

$K_2O$ 0.32-0.34 wt. %;

$Na_2O$ 13.2-13.4 wt. %; and $Al_2O_3$ 1.1-1.3 wt. %.

Clause 44. The glass composition of clause 43 further comprising 0.16-0.18 wt. % $Fe_2O_3$.

Clause 45. The glass composition of clause 43 or clause 44 wherein the ratio of $Na_2O$ to $Al_2O_3$ is 10.4-11.2 wt. %/wt. %.

Clause 46. The glass composition of any one of clause 43-45 wherein the ratio of CaO to MgO is 1.7-1.9 wt. %/wt. %.

Clause 47. The glass composition of any one of clause 43-46 wherein the ratio of $Na_2O$ to $Al_2O_3$ is 10.5-10.9 wt. %/wt. %.

Clause 48. The glass composition of any one of clause 43-47 wherein the ratio of $Na_2O$ to $Al_2O_3$ is 10.7-11.0 wt. %/wt. %.

Clause 49. The glass composition of any one of the clauses 43-50 further comprising a colorant, wherein the colorant comprises CoO in a range of 0.004 wt. % to 0.006 wt. %.

Clause 50. The glass composition of any one of the clauses 43-49 further comprising a colorant, wherein the colorant comprises Se in a range of 0.0003 wt. % to 0.0007 wt. %.

Clause 51. The glass composition of any one of the clauses 43-50 further comprising a colorant, wherein the colorant comprises $Cr_2O_3$ in a range of 0.0002 wt. % to 0.0005 wt. %.

Clause 52. The glass composition of any one of the clauses 43-51 further comprising a colorant, wherein the colorant comprises $MnO_2$ in a range of 0.005 wt. % to 0.007 wt. %.

Clause 53. The glass composition of any one of the clauses 43-52 further comprising a redox between 0.22 and 0.25.

Clause 54. A glass composition comprising a base glass portion comprising:
$SiO_2$ 71.6-71.8 wt. %;
CaO 8.0-8.2 wt. %;
MgO 4.6-4.7 wt. %;
$K_2O$ 0.32-0.33 wt. %;
$Na_2O$ 13.1-13.3 wt. %; and
$Al_2O_3$ 1.2-1.3 wt. %.

Clause 55. The glass composition of clause 54 further comprising 0.4-0.6 wt. % $Fe_2O_3$, preferably 0.49-0.58 wt. % $Fe_2O_3$.

Clause 56. The glass composition of clause 54 or clause 55 wherein the ratio of $Na_2O$ to $Al_2O_3$ is 10.5-10.9 wt. %/wt. %.

Clause 57. The glass composition of any one of clause 54-56 wherein the ratio of CaO to MgO is 1.7-1.8 wt. %/wt. %.

Clause 58. The glass composition of any one of the clauses 54-57 further comprising a colorant, wherein the colorant comprises CoO in a range of 0.0007 wt. % to 0.002 wt. %.

Clause 59. The glass composition of any one of the clauses 54-58 further comprising a colorant, wherein the colorant comprises $Cr_2O_3$ in a range of 0.0003 wt. % to 0.0005 wt. %.

Clause 60. The glass composition of any one of the clauses 54-59 further comprising a colorant, wherein the colorant comprises $MnO_2$ in a range of 0.005 wt. % to 0.007 wt. %.

Clause 61. The glass composition of any one of the clauses 54-60 further comprising a redox between 0.47 and 0.54.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A glass composition comprising:
a base glass portion comprising:
65-75 wt % $SiO_2$;
5-9.5 wt % CaO;
2.6-5 wt % MgO;
0-5 wt % $K_2O$;
10-14 wt % $Na_2O$; and
0.8-1.47 wt % $Al_2O_3$; and
a colorant portion comprising:
30 to 120 ppm of CoO; and
no more than 7.5 ppm selenium,
wherein the glass composition has a ratio of $Na_2O$ to $Al_2O_3$ in the range of 10.0-11.5 wt. %/wt.%, wherein the glass composition has a ratio of CaO to MgO in the range of 1.7 to 1.9 wt. %/wt.%, wherein the glass composition has an iron redox ratio in the range of 0.221-0.311, wherein the total iron in the glass composition is in the range of 0.01 to 0.30 wt. %, and wherein a glass sheet formed from the glass composition has an a* in the range of −3 to +1 and a b* in the range of −2 to −12.

2. The glass composition of claim 1, wherein the base glass portion comprises 0.1-0.5 wt % $K_2O$.

3. The glass composition of claim 1, wherein the base glass portion comprises:
68-74 wt % $SiO_2$;
13-13.5 wt % $Na_2O$;
1-1.4 wt % $Al_2O_3$;
8.1-8.6 wt % CaO; and
4.5-5 wt % MgO.

4. The glass composition of claim 1, wherein the glass sheet has an a* in the range of −2.5 to 0 and a b* in the range of −4 to −9.

5. The glass composition of claim 1, wherein the glass sheet has a visible light transmittance of no greater than 80%.

6. The glass composition of claim 1, wherein the colorant portion comprises selenium in an amount from greater than 0 ppm to 3 ppm.

7. The glass composition of claim 1, wherein a colorant portion comprises at least one of the following oxides of manganese, tin, cerium, molybdenum, vanadium, copper, zinc, tungsten, and lanthanum, or any combination thereof.

8. The glass composition of claim 1, wherein the glass composition comprises 0.16-0.18 wt. % $Fe_2O_3$.

9. A glass composition comprising:
a base glass portion comprising:
71.2-71.6 wt. % $SiO_2$;
8.3-8.6 wt. % CaO;
5.0-5.2 wt. % MgO;
0.24-0.25 wt. % $K_2O$;
13.4-13.5 wt. % $Na_2O$; and
1.1-1.2 wt. % $Al_2O_3$; and
a colorant portion comprising:
30 to 120 ppm of CoO; and
no more than 7.5 ppm selenium, wherein the glass composition has a ratio of $Na_2O$ to $Al_2O_3$ in the range of 11.17-12.27 wt. %/wt.%, wherein the glass composition has an iron redox ratio in the range of 0.221-0.311, wherein the total iron in the glass composition is in the range of 0.01 to 0.30 wt. %, and wherein a glass sheet formed from the glass composition has an a* in the range of −2.5 to 0 and a b* in the range of −5 to −9.

10. The glass composition of claim 9, wherein the glass composition comprises 0.20-0.21 wt. % $Fe_2O_3$.

11. The glass composition of claim 9, wherein the ratio of CaO to MgO is 1.7 to 1.9 wt. %/wt.%.

12. A method of producing a glass sheet comprising:

feeding raw batch materials into a container;

melting the raw batch materials in the container to form a molten glass composition;

passing the molten glass composition from the container into a pool of a molten metal such that the molten glass composition floats in the pool of molten metal;

forming the molten glass composition into a shape of a flat glass sheet on the pool of molten metal; and cooling the molten glass composition to form the flat glass sheet, wherein the flat glass sheet comprises the glass composition of claim 1.

13. The glass composition of claim 1, wherein the glass composition has a ratio of $Na_2O$ to $Al_2O_3$ in the range of 10.5-11.0 wt. %/wt.%, and wherein the glass sheet formed from the glass composition has an a* in the range of −2.5 to 0 and a b* in the range of −4 to −9.

14. The glass composition of claim 1, wherein the glass composition has a ratio of $Na_2O$ to $Al_2O_3$ in the range of 10.55-10.90 wt. %/wt.%, and wherein the glass sheet formed from the glass composition has an a* in the range of −1.8 to −0.5 and a b* in the range of −5 to −8.

* * * * *